June 23, 1970     G. B. DUNNINGTON ET AL     3,517,095

EXTRUSION PROCESS

Original Filed Aug. 14, 1963     2 Sheets-Sheet 1

INVENTOR
REUBEN T. FIELDS
GORDON B. DUNNINGTON

BY *Earl L. Handley*

ATTORNEY

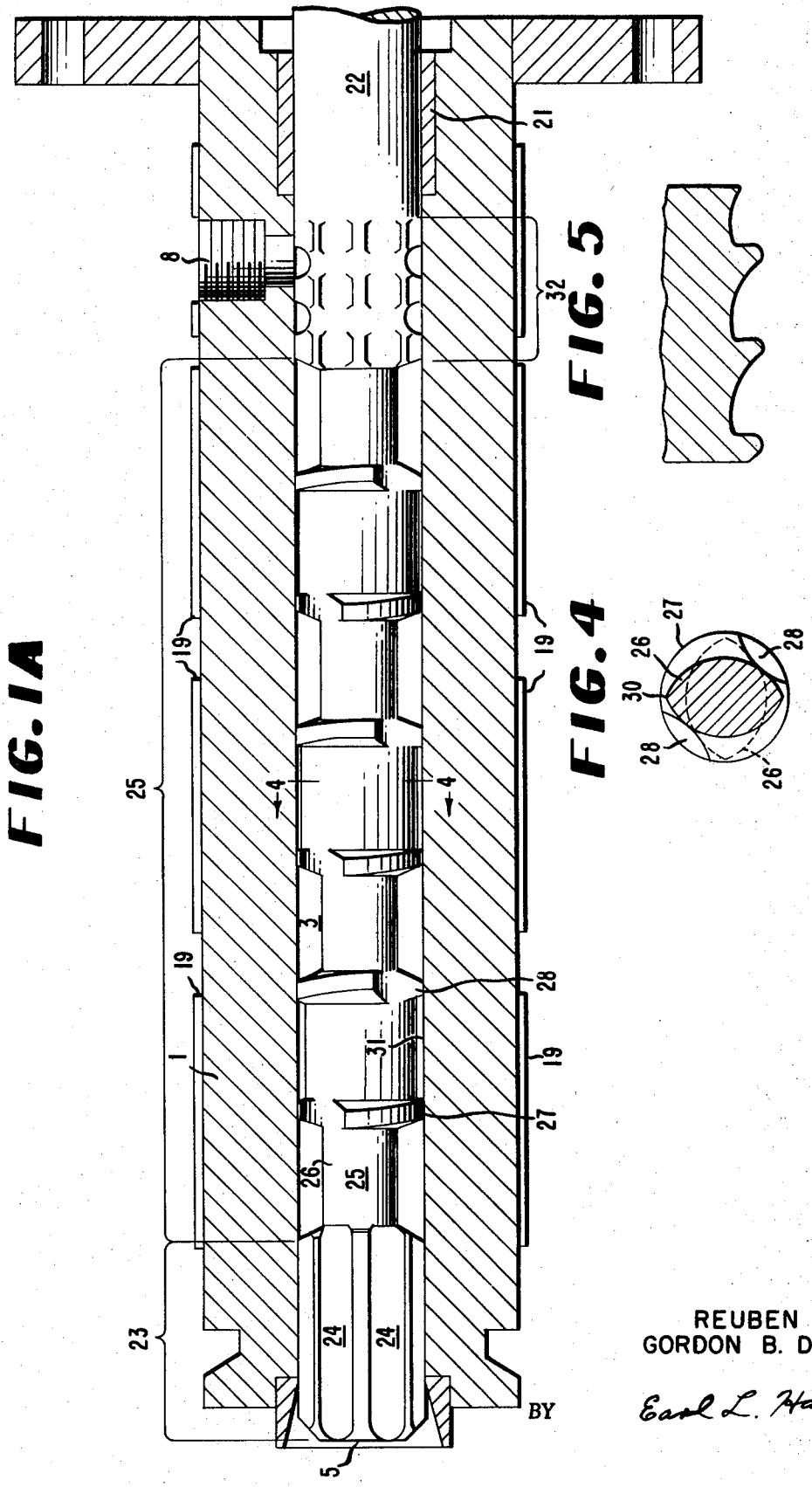

United States Patent Office 3,517,095
Patented June 23, 1970

3,517,095
EXTRUSION PROCESS
Gordon Beale Dunnington and Reuben Thomas Fields, Wilmington, Del., assignors to E. I. du Pont de Nemours and Company, Wilmington, Del., a corporation of Delaware
Original application Aug. 14, 1963, Ser. No. 302,037, now Patent No. 3,325,865, dated June 20, 1967. Divided and this application Dec. 1, 1966, Ser. No. 598,267
Int. Cl. B28b *3/22;* B29b *1/04;* B29f *3/02*
U.S. Cl. 264—176  2 Claims

ABSTRACT OF THE DISCLOSURE

A process which comprises the steps of continuously compacting finely divided plastic material to form a tubular structure having threads on both its inner and outer surfaces, advancing and fragmenting the plastic tubular structure, advancing the fragmented plastic into a melting zone, mixing the plastic material to raise its temperature above its melting point, and withdrawing molten plastic from the melting zone.

---

This application is a division of U.S. application Ser. No. 302,037, filed Aug. 14, 1963 which issued June 20, 1967 as U.S. Pat. 3,325,865.

This invention relates to an extrusion process and apparatus. Specifically, this invention relates to extrusion of resin material in which finely divided resin particles are continuously compacted to form a continuous essentially solid state extrudate which extrudate is then melted chiefly by the application of mechanical energy and the melted product extruded in the desired form. This invention is particularly applicable to resins which have high melt viscosity and have low surface friction against metal when in the melted or semi-melted state, and to resins which have a narrow softening temperature range and low viscosity when melted.

Resin molding powders having high melt viscosity or sharp melting points are difficult to mold and extrude. In the past such materials have been processed through conventional extrusion machines, but the results have not been predictable or satisfactory. Non-uniform flow from the outlet of the extrusion machine caused by an excessive adhesion of the screw and insufficient adhesion to the extrusion barrel wall, has been a major problem in trying to extrude polymers of this type. In extruding polymer having a narrow softening temperature range and low melt viscosity, in a conventional machine, the mixture of melted and unmelted polymer is of varying viscosity, and varying viscosity affects the polymer gripping ability of the screw and results in no-uniform flow. This non-uniform flow, sometimes called surging, has been alleviated to some extent by operating the extrusion machine at low through-put, but this is not economical.

It is an object of this invention to provide a process for the extrusion of polymers having high melt viscosity or sharp melting point, at substantially uniform flow, and at high through-put. It is a further object to provide a new extrusion machine that can be used to extrude polymers of high melt viscosity or sharp melting point at substantially uniform flow and at high through-put. It is a further object of this invention to provide an extrusion machine in which the polymer melting section can be controlled independently of the polymer compaction section. It is a further object to provide an apparatus that can, by its uniform forward feeding action, effectively manipulate solid polymer to push molten polymer out an extrusion port. Another object of this invention is to provide a new extrusion machine that will provide better temperature control, use less energy, and operate at higher through-puts when operating on conventional polymers. Other objects and advantages will be apparent to one skilled in the art from the description when read in conjunction with the accompanying drawings, wherein:

FIG. 1 is a sectional partly elevational view of the metering (rear) portion of the extrusion machine.

FIG. 1–A is a sectional partly elevational view of the melting (front) portion of the extrusion machine.

FIG. 4 is a cross-sectional view taken along line 4—4 of FIG. 1–A, showing the cam-like portions of the melting section and the bearing-like portions of the melting section.

FIG. 5 shows a longitudinal sectional view of the thread of the screw.

Figure 1:
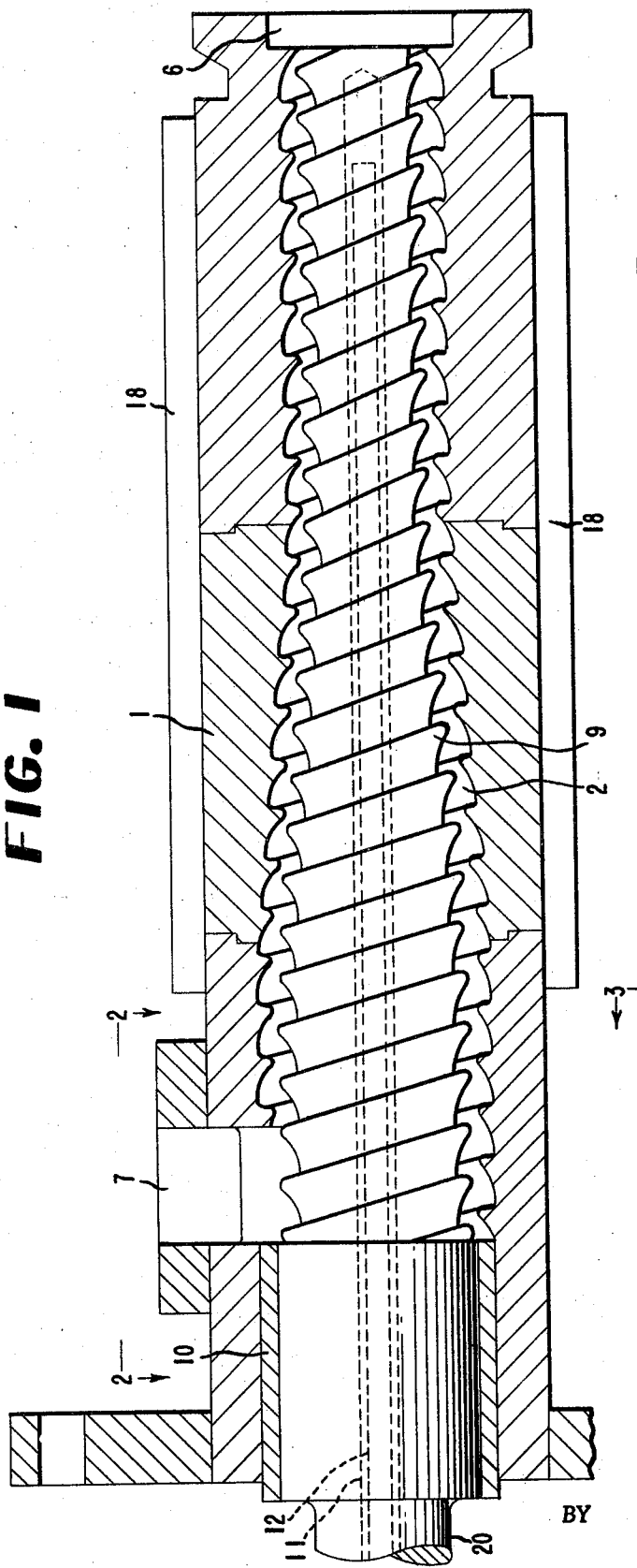
Figure 3:
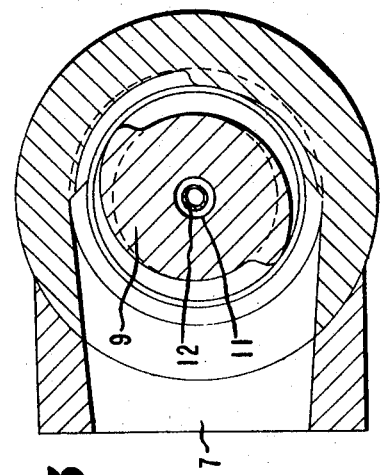
FIG. 3 is a cross-sectional view taken along line 3—3 of FIG. 2, showing the double lead of the screw thread and the threaded barrel.
Figure 2:
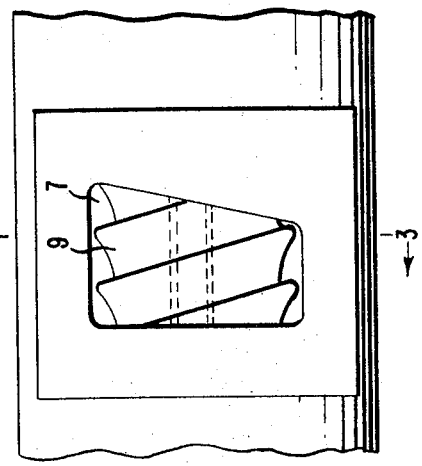
FIG. 2 is an elevational view taken along line 2—2 of FIG. 1, showing the inlet port.

As may be seen from the drawings, particularly FIGS. 1 and 1–A, the apparatus comprises a housing 1, having a threaded bore 2 (FIG. 1) and a smooth bore 3 (FIG. 1–A). The two sections are machined so that alignment bushing 4 and the end of melting shaft 5 fit into recess 6. The threaded bore 2 is tapered throughout part of its length. The housing 1 has an inlet port 7 located adjacent the end of the housing having the largest bore diameter, and an outlet port 8 located adjacent the opposite end. A double lead screw 9, located within the threaded bore 2, has the same degree and direction of taper as does the threaded bore 2. The double lead screw is suitably journaled for rotation at 10. The double lead screw has a centrally located channel 11 containing tube 12 for circulation of a heat exchange fluid. Electrical resistance heaters 18 and 19 surround portions of the housing. The double lead screw is rotated by a motor (not shown) attached to the extended portion 20 of screw 9.

The melting shaft 5, journaled for rotation at 21 by a motor (not shown) is attached to the extended portion 22 of shaft 5. (This journal bearing also serves as a seal against passage of melted polymer along the shaft.) In the embodiment illustrated, there are three distinct sections to the melting shaft 5. Section 23 has parallel longitudinal flutes 24 on its surface. Section 25 forms the major portion of the melting shaft. This section contains cam-like surfaces 26 and bearing-like surfaces 27. (Surfaces 27 partially block the longitudinal flow of melt and force the polymer to pass over the close clearance points, space 31, of the cam-like surfaces.) The cam-like surfaces are not in the same plane (see FIG. 4 in which a cross-section shows one cam-like surface at ninety degrees to the other. Note that the horizontal cam-like surface is shown in phantom because of interposed bearing-like surface 27.) Bearing-like surfaces 27 have a recess 28 which are not aligned. As can be seen in the drawing, the cam-like surfaces are progressively slightly larger as the outlet port is approached, that is, the space 31 between the point of the cam 30 and the smooth bore 3 becomes progressively smaller as the outlet port is approached.

The third section of the mixing shaft is the extrusion head portion 32 which is longitudinally fluted and circumferentially cross-fluted.

The apparatus illustrated in the drawing is the preferred structure of this invention; however, many changes may be made and a highly satisfactory extrusion machine still be had. For example, in some operations it is not necessary that the mixing shaft and the tapered threaded screw operate at different rotational speeds, and therefore the mixing shaft and the screw may be joined in a single piece and driven with a single motor from one end. The tapered threaded screw may be triple or even quadruple lead. The thread need not be of the buttress type.

The melting shaft of the screw need not have three distinct sections. In fact, any configuration of the shaft that will yield a high degree of mechanical working and little or no advancing thrust to the polymer is highly satisfactory.

The relationship between the compressive screw and the housing must be such that the finely divided polymer feed material is compressed into a solid mass as it enters the non-tapered screw section. If the screw and the housing have ratios of large diameter to small diameter of about 3 to 2, most finely divided polymers will be compressed to a solid. In the embodiment shown in the drawings the screw depth is the same throughout the length of the screw, but when working with lower bulk density polymers which compact to a greater extent, the thread depth of the screw may be altered at the inlet end by grinding out a portion of the root between the flights thus allowing the screw to take up a bigger mass of polymer. Compaction of the polymer can also be accomplished by making the thread depth of both the screw and the housing progressively shallower, instead of, or in addition to, tapering the diameter. Since the compacted polymer is moved as a solid mass at least from the point at which the screw becomes uniform in diameter, the lead angles of threads of the screw and the housing must be such that the polymer mass slips both with respect to the screw and the housing without causing internal deformation, particularly shear, of the polymer mass. Normally the minimum lead angle of the thread of the screw is slightly greater than the lead angle of the thread of the housing, due to the difference in the diameter of the two surfaces. The minimum lead angles for the screw should be between about 15 and about 20 degrees, and the corresponding lead angle for the thread of the housing should be between about 13 to 18 degrees. In the tapered section of the screw and the housing the lead angle will, of course, vary with the degree of taper, but in general, the lead angle should be such that the distance between adjacent threads is constant throughout the length of the screw and of the housing; in other words, if the distance between flights of the screw in the non-tapered section of the screw is 1.5 inches, then the distance between flights in the tapered section of the screw should be 1.5 inches. The use of triple or quadruple lead screws and housings normally allows the use of greater lead angles, and the device will operate with lead angles up to 60 degrees. Larger lead angles result in more through-put per revolution of the compaction screw, but require a higher drive torque.

In operation, finely divided preheated polymer is fed through opening 7 into housing 1. The screw section 9 is rotated and the polymer advanced toward the melting shaft. As the polymer advances the volume between the screw flights decreases due to the decrease in diameter of the screw and/or depth of the screw flights. This decrease in volume causes the polymer particles to be pressed together to form a solid mass. The threaded barrel is heated by external heaters. As the polymer reaches the end of the taper of the screw, its compaction is complete. It is usually desirable to overfeed the screw slightly so that the screw tries to squeeze the polymer into a volume slightly smaller than the polymer can be compressed. This results in some back-flow of the polymer, but assures that the polymer is fully compressed when it enters the non-tapered portion of the screw. The non-tapered portion of the screw serves mainly as a metered pumping section, which generates sufficient forward thrust to push the polymer through the melting section and out through the outlet port without disturbing the feeding and compacting action of the tapered portion.

The solid compacted polymer is advanced through the non-tapered section of the housing by unscrewing from the threaded housing and the threaded non-tapered screw. The product issuing from the end of the threaded screw adjacent the melting shaft is a solid continuous but frangible plastic tube threaded on both its outside and inside. The end of this plastic tube is immediately fragmented by the parallel longitudinally fluted portion of melting shaft 5. Since the continuous plastic tube advances continuously, the fragments are pushed through the flutes of the parallel fluted section and into contact with the cam-like mixing surfaces of the shaft where the polymer is kneaded and mixed. The mixing portion of the housing is at a temperature at or above the melting point of the polymer. Initially, the temperature is raised to this point by means of the electrical heater 19. The speed of rotation of the melting shaft is regulated so that by the time the polymer is pushed out of the non-threaded housing through outlet port 8, the polymer is in the desired molten form. Thus, the invention allows uninterrupted uniform discharge of a molten polymer by pushing the molten polymer with solid polymer.

In the following examples which illustrate the process of this invention, all parts and percentages are in parts by weight unless otherwise noted.

EXAMPLE I

Using an apparatus such as that illustrated in the drawing in which the threaded non-tapered screw section was of 2-inch diameter on which the double lead right-handed buttress type threads were of ¾ inch spacing (1½ inch pitch) and ⅜ inch depth, the largest diameter of the tapered screw section being 3 inches, polytetrafluoroethylene-hexafluoropropylene copolymer powder producible by the process disclosed in U.S. Pat. 2,946,763, issued July 26, 1960 to Bro et al., having a specific melt viscosity of $1 \times 10^5$ was introduced. The left-hand threads on the housing were also of ¾ inch spacing and ⅜ inch depth. The section of the screw under the inlet port was about 2 inches long, the tapered section about 5 inches long, and the non-tapered section about 8 inches long. The melting shaft was about 18 inches long. The polymer was preheated prior to its introduction into the inlet port to about 55° C. Cold water was introduced through pipe 12 and removed through channel 11 to cool the screw. Heaters 18 were set at 250° C. and heaters 19 were set at 370° C. The screw was rotated at 16 r.p.m., and the mixing shaft at 150 r.p.m. Molten resin, at a temperature of 390° C. at the rate of 85 lbs./hr., was extruded through outlet port 8.

EXAMPLE II

Nylon polymer cubes were preheated to about 65° C. and fed into the extruder described in Example I. The heaters on the mixing section of the housing were set at 275° C. The heaters on the threaded section of the housing were set at 150° C. The screw section was rotated at 48 r.p.m., and the mixing shaft was rotated at 180 r.p.m. Molten nylon polymer was extruded through outlet port at the rate of 110 lbs./hr. at 285° C.

The apparatus works equally as well on polyoxymethylene resins, polyethylene resins, polypropylene resins, polyethylene terephthalate resins and polycaprolactam resins.

What is claimed is:

1. A process for the manipulation of plastic materials which comprises continuously forming a tubular structure having threads on both of its inner surface and its outer surface by continuously compacting a finely divided plastic material in an annular zone bounded by threaded surface and having a slightly greater lead angle lar structure having a lead angle of from about 15 to 60 degrees, being opposite handed to those on said outer outer surface and having a slightly greater lead angle than those on said outer surface which vary from about 13 to 60 degrees, continuously advancing said tubular structure into a fragmenting zone, continuously fragmenting the plastic tubular structure, continuously advancing the fragmented plastic into a melting zone, continuously mixing the plastic material to raise its temperature above its melting point, and continuously withdrawing molten plastic from the melting zone.

2. The process of claim 1 in which the tubular structure is advanced into the fragmenting zone by a helically twisting motion.

References Cited

UNITED STATES PATENTS

| | | | |
|---|---|---|---|
| 2,813,302 | 11/1957 | Beck | 264—176 |
| 3,025,565 | 3/1962 | Doriat et al. | 264—176 |
| 3,102,717 | 9/1963 | Frenkel | 264—176 |
| 3,121,914 | 2/1964 | Olson et al. | 264—349 |

ROBERT F. WHITE, Primary Examiner

J. R. THURLOW, Assistant Examiner

U.S. Cl. X.R.

264—312, 349

PO-1050
(5/69)

UNITED STATES PATENT OFFICE
CERTIFICATE OF CORRECTION

Patent No. 3,517,095      Dated June 23, 1970

Inventor(s) Gordon B. Dunnington & Reuben T. Fields

It is certified that error appears in the above-identified patent and that said Letters Patent are hereby corrected as shown below:

Column 4, line 63, delete "of" after "both". Column 4, line 66, "surface" should be -- surfaces --. Column 4, line 66, after "surfaces" and before "and" an omission was made which insertion should be -- said threads on said inner surface of said tubular structure having a lead angle of from about 15 to 60 degrees, being opposite handed to those on said outer surface --.

SIGNED AND
SEALED
DEC 15 1970

(SEAL)
Attest:

Edward M. Fletcher, Jr.
Attesting Officer

WILLIAM E. SCHUYLER, JR.
Commissioner of Patents